United States Patent [19]
Muller

[11] 3,794,096
[45] Feb. 26, 1974

[54] WEB LINK FOR TIRE ANTI-SKID CHAINS

[75] Inventor: Anton Muller, Unterkochen, Germany

[73] Assignee: Eisen-und Drahtwerk Erlau Aktiengesellschaft, Aalen, Germany

[22] Filed: Mar. 23, 1972

[21] Appl. No.: 237,394

[30] Foreign Application Priority Data
Mar. 24, 1971 Germany.......................... 92114201

[52] U.S. Cl. ............................................... 152/243
[51] Int. Cl. ............................................ B60c 27/06
[58] Field of Search............................ 152/243, 239

[56] References Cited
UNITED STATES PATENTS
3,072,170  1/1963  Cowhig.............................. 152/243
1,509,573  9/1924  Waters................................ 152/243
1,431,771  10/1922  Berglund............................ 152/243
2,171,995  9/1939  Schmidt, Jr......................... 152/243

Primary Examiner—James B. Marbert
Attorney, Agent, or Firm—Walter Becker

[57] ABSTRACT

A reversible web link for anti-skid tire chains which has pairs of approximately parallel road engaging and/or tire engaging surfaces and also has a receiving opening for receiving connecting links, all outer peripheral surfaces of said link forming road and/or tire engaging surfaces, being substantially symmetrically arranged about the substantially axis symmetrical receiving opening.

13 Claims, 6 Drawing Figures

PATENTED FEB 26 1974 3,794,096
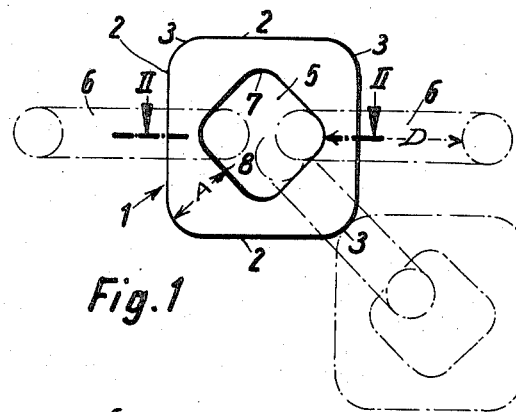
Fig.1
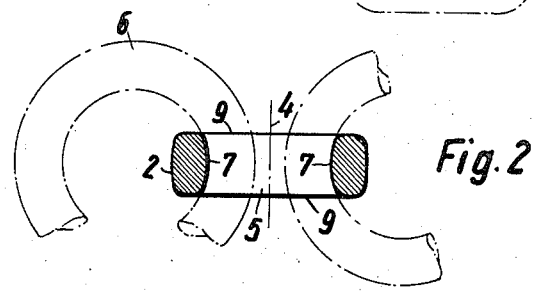
Fig.2
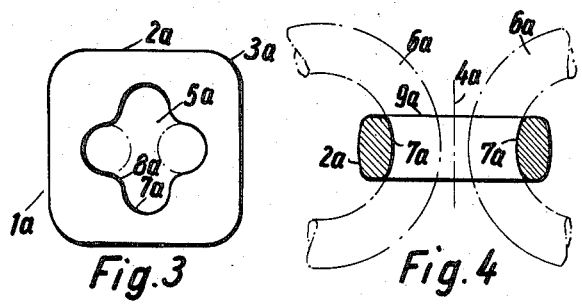
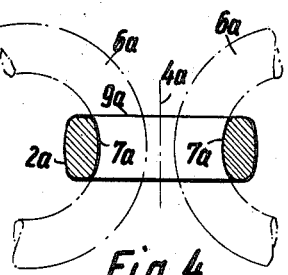
Fig.3    Fig.4
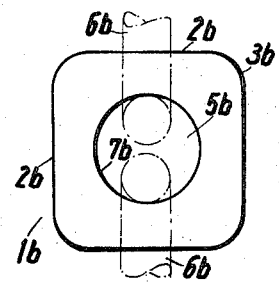
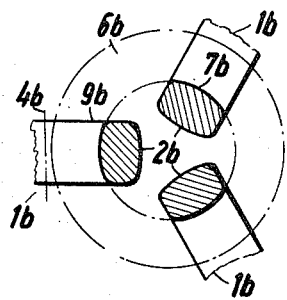
Fig.5    Fig.6

WEB LINK FOR TIRE ANTI-SKID CHAINS

The present invention relates to a web link for tire anti-skid chains which link has approximately outer edges that form running end or tire engaging surfaces, said web link being provided with a receiving opening for connecting elements or links such as annular links.

It is an object of the present invention so to design a web link of this type that it will have a simple construction and a long useful life. These objects and other objects and advantages of the invention will appear more clearly from the following specification in connection with the accompanying drawing in which:

FIG. 1 is a view of a web link according to the invention.

FIG. 2 represents a section taken along the line II—II of FIG. 1.

FIGS. 3 and 4 illustrate a further embodiment of the invention in an illustration similar to that of FIGS. 1 and 2.

FIG. 5 is a view of still another embodiment of a web link according to the invention.

FIG. 6 shows in cross section three web links according to FIG. 5 in a three point arrangement.

The web link according to the present invention is characterized primarily in that all outer edges of the web link which forms a reversible link are designed as running and/or tire engaging surfaces and are substantially symmetrically arranged around the at least approximately asymetric single receiving opening. When one outer edge of the running surface of the reversible link has worn off, the reversible link can be turned by 90° or 180° so that a new outer edge will become effective as running surface. In this way a considerably greater wear volume is obtained over heretofore known web links.

According to a further feature of the invention all outer edges have the same length while the web link preferably has a square shaped basic form. In the last mentioned instance it is possible to wear the web link on four sides and the web link is surface hardened on four sides.

In order to assure that the dimensions of the tire anti-skid chain will in each turned position or condition of the web link or web links be the same, the axis of the receiving opening is located in the center between all outer edges.

A very simple turning of the web links can be obtained when the receiving opening is round, especially circular.

For purposes of precisely fixing the location of the web link in the chain structure, it is, however, also advantageous when the receiving opening has a number of individual openings corresponding to the number of outer edges, said individual openings opening toward the common center of the receiving opening.

The central planes of the individual openings are expediently parallel to the outer edges of the web link so that the outer edges of the web links will be able in a simple manner to align themselves parallel to the plane of the stretched out tire anti-skid chain. This may for instance be realized by having the inner edge sections located symmetrically with regard to the angle bisector between the two pertaining adjacent outer edges while the recess with a square shaped basic form of the web link preferably has a diamond shape.

For purpose of obtaining a particularly favorable movability of the web link relative to the connecting links, the individual openings are concave preferably rounded with a radius of curvature which equals the radius of curvature of the cross section of the connecting links.

The individual openings may, however, also have a semi-circular contour. This is particularly expedient when adjacent individual openings through convexly curved inner edge sections merge with each other. As a result thereof, protrusions are formed between adjacent individual openings by means of which an accidental turning of the web link relative to the connecting links will be prevented. Expediently, the distance between protrusions which are located diagonally opposite to each other is less than twice the diameter of the cross section of the connecting links whereby the said accidental turning of the web links will be prevented in a particularly effective manner.

For additionally improving the movability of the connecting links relative to the web links, the inner edge of the receiving opening is in cross section convexly curved preferably with a radius of curvature which equals the inner radius of the connecting links.

For improving the running properties, also the outer edges of the web link may in cross section be curved convexly.

According to a further development of the invention, adjacent outer edges of the web link merge through convex edge sections with each other while the radius of curvature of said edge sections preferably corresponding to about one-sixth of the length of the outer edges so that the tire will be saved in a particularly effective manner.

In view of the web link according to the present invention, a considerably reduced division of the tire anti-skid chain is obtained so that a so called three point suspension is possible according to which always three web links engage one connecting link. The reduced division or three point suspension has the advantage that relatively narrow configurations of the tire anti-skid chain are obtained in as much as hexagonal configurations are possible. Moreover, especially with a wet sludgy road, the connecting links can turn very well relative to the web links so that an extremely uniform wear of all links and especially on the inner edges of the web links will be obtained. In this way the chain will have a highly efficient grip. Finally the connecting annular links can be made with a very small inner width and with large cross sectional diameter. This is particularly advantageous with regard to the strength of the chain. The web links according to the invention are of light weight and can be produced at low cost.

Referring to the drawings in detail, and to FIGS. 1 and 2 in particular, these FIGS. show a web link 1 which is in the form of a plate and has a square shaped basic form so that it has four outer edges 2 of substantially identical length which are arranged at a right angle with regard to each other. Adjacent outer edges 2 merge with each other through convex corner sections 3 which follow a quarter of a circle. The radius of curvature of these sections 3 corresponds approximately to one-sixth of the length of the outer edges 2.

Provided in the web link 1 is a receiving opening 5 for connecting links 6 which are indicated by dot dash lines. The axis of the receiving opening 5 is located on the line of intersection of the planes of symmetry of each pair of oppositely located sides 2. In the embodiment specifically illustrated in FIGS. 1 and 2, the receiving opening 5 is diamond shaped so that the concavely curved corner sections 7 form individual areas for receiving the connecting link 6. These individual areas 7 are interconnected through rectilinear inner edge sections 8. The radius of curvature of the quarter circle shaped individual areas 7 corresponds to half the cross sectional diameter of the connecting link 6 so that these links 6 over a large surface engage the individual areas 7. Furthermore, the inner edges 7, 8 of the receiving opening 5 are in cross section, according to FIG. 2, convexly curved along a portion of a circle. The radius of curvature equals half the inner diameter of the connecting links 6 so that the contact areas are substantially over the entire surface engaged by the connecting links 6. The lateral surfaces 9 of the web link 1 are substantially parallel to each other and at a right angle to the axis 4.

The receiving opening 5 is so dimensioned that its rectilinear inner edge sections 8 are spaced from the respective pertaining adjacent outer corner edge section 3 by a distance A which equals or is only slightly greater than half the inner diameter D of the connecting links 6 so that when two adjacent web links 1 turn relative to each other, an arrangement will be obtained as it is indicated in FIG. 1 by dot dash lines and according to which the adjacent web links 1 are just able to pass each other.

In FIGS. 3 and 4 those parts thereof which correspond to similar parts of FIGS. 1 and 2 have been designated with the same reference numerals as in FIGS. 1 and 2 but with the additional character a. As will be seen from FIGS. 3 and 4, the individual engaging areas 7a are semi-circular while between each two adjacent individual areas 7a there is provided a convexly curved protrusion 8a following a portion of a circle, so that a cross shaped design of the receiving opening 5a is obtained. The distance between diagonally oppositely located protrusions 8a is less than twice the cross sectional diameter of the connecting links 6a. However the width of the receiving opening 5a is selected of such magnitude that when a connecting link 6a engages an individual engaging area 7a, the other connecting link 6a can from the oppositely located individual area 7a be conveyed to an adjacent individual engaging area 7a.

FIGS. 5 and 6 illustrate a further embodiment of the invention in which those parts corresponding to the parts of FIGS. 1 and 2 are designated with the same reference numerals as in FIGS. 1 and 2 but with the additional character b. As will be seen from FIGS. 5 and 6, the receiving opening 5b is circular so that the web link 1b can particularly easily be turned relative to the connecting links 6b. The diameter of the receiving opening 5b is only slightly greater than twice the cross sectional diameter of the connecting links 6b.

As will be seen from FIG. 6, the web links 1b according to the invention may be so arranged that three web links 1b are interconnected by one connecting link 6b while being offset with regard to each other for instance by an angle of 120°.

As will be furthermore seen from FIGS. 2, 4, and 6, the outer edges 2, 2a, 2b of the web links 1, 1a, 1b are in cross section convexly curved while the radius of curvature is for instance greater by one half than the radius of curvature of the inner edges 7, 8; 7a, 8a; 7b.

In addition to the outer surface or the outer side of the web link, elevations or depressions, for instance beads, knobs, or the like may be provided.

It is, of course, to be understood that the present invention is, by no means, limited to the particular showing in the drawing but also comprises any modification within the scope of the appended claims. Moreover, the present invention is by no means limited to the specific chains referred to above but is as well applicable in connection with anti-skid chains such as for instance snow tire chains.

What I claim is:

1. A web link for anti-skid tire chains which is reversible and is provided with a single at least approximately axis symmetric opening for receiving connecting rings, said link also being provided with circumferential surfaces at least approximately symmetrically arranged around said opening so as to form pairs of oppositely located substantially parallel circumferential surfaces each equally well adapted to engage both road surfaces and tire surfaces so that selectively at sequential time intervals different wear surfaces are brought into engagement with road surfaces and tire surfaces respectively equally as well, said link also being provided with lateral surfaces each having a considerably greater width than that of said circumferential surfaces.

2. A web link according to claim 1, in which all of said circumferential surfaces are of substantially the same length and define a square, the lateral surfaces of said link being substantially parallel to each other and being located in planes substantially perpendicular to the planes tangential to said circumferential surfaces.

3. A web link according to claim 1, in which said single opening is substantially round and has its central axis substantially evenly spaced from all of said circumferential surfaces.

4. A web link according to claim 1, in which said single opening is provided with two pairs of oppositely located rounded portions, and in which each plane bisecting the rounded portions of a pair of rounded portions is substantially parallel to two oppositely located circumferential surfaces of said link, the number of said rounded portions corresponding to the number of said circumferential surfaces.

5. A web link according to claim 4, in which each two adjacent ones of said rounded portions are interconnected by a straight surface so that two pairs of oppositely located straight surfaces interconnected by said rounded portions are formed, each plane bisecting a pair of oppositely located straight surfaces substantially bisecting two outer corner portions of said link.

6. A web link according to claim 4, in which said rounded portions are concave and have a radius of curvature corresponding to the inner curvature of the connecting rings to be received by said opening.

7. A web link according to claim 1, in which said single opening has crosswise arranged concave rounded portions and crosswise arranged convex portions, the arrangement being such that each two adjacent concave rounded portions are interconnected by a convex portion, the distance between oppositely arranged convex portions being less than twice the diameter of the cross section of the connecting links to be received in said single opening.

8. A web link according to claim 1, in which the inner peripheral surfaces of the link which inner peripheral surfaces define said single opening is cross-sectionally convex whereas the outer circumferential surfaces of said link are cross-sectionally convex.

9. A web link according to claim 8, in which the radius of curvature of said inner peripheral surfaces substantially corresponds to the inner radius of the connecting rings to be received in said single opening of said link.

10. A web link according to claim 8, in which the outer peripheral surfaces of said link comprise straight sections of substantially equal length and corner sections respectively merging with adjacent straight sections, each of said corner sections having a radius of curvature having a length approximating one-sixth of the length of one of said straight sections.

11. A web link according to claim 1, in which said single opening has a circular cross section.

12. A web link according to claim 1, in which the outside of the web link has an elevation.

13. A web link according to claim 1, in which the outside of said web link has a depression.

* * * * *